Oct. 4, 1955      L. P. CROSET      2,719,412
FLEXIBLE COUPLINGS DAMPERS AND LIKE DEVICES
Filed Sept. 9, 1952      2 Sheets-Sheet 1
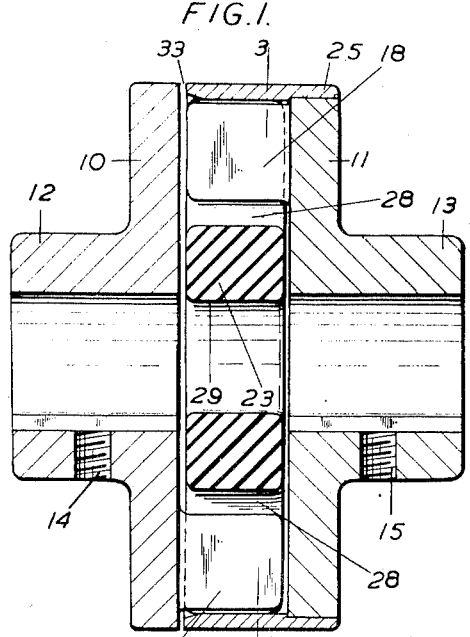
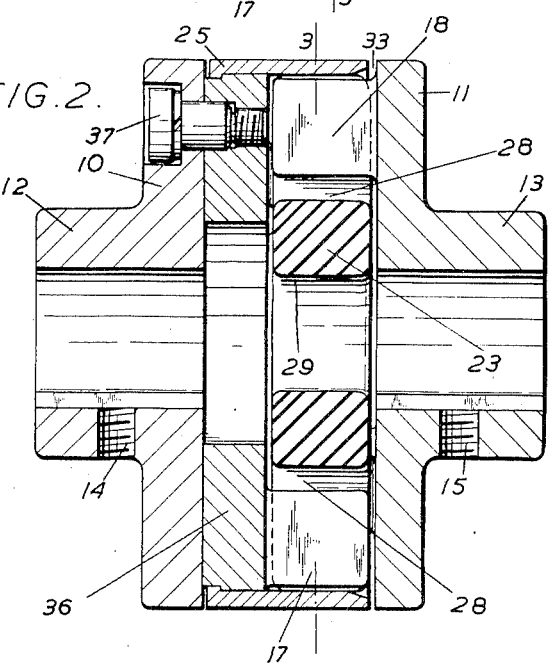
Inventor
LOUIS PAUL CROSET
By Young, Emery & Thompson
Attorneys

United States Patent Office 2,719,412
Patented Oct. 4, 1955

2,719,412

FLEXIBLE COUPLINGS DAMPERS AND LIKE DEVICES

Louis Paul Croset, Huddersfield, England

Application September 9, 1952, Serial No. 308,581

Claims priority, application Great Britain September 12, 1951

1 Claim. (Cl. 64—14)

This invention relates to flexible couplings dampers and like devices of the kind comprising two concentric (co-axial) members, two sets of blades which extend radially and longitudinally of the said members and which blades are connected alternately in the circumferential direction to one and the other of said concentric members, and an outer drum surrounding the blades so as to form cells which contain blocks of rubber or synthetic rubberlike material so that one face of each block engages the blade of one of the two concentric members and the other face a blade of the other concentric member, the blocks being preferably free from any locating bolts therein.

According to the present invention the rubber blocks are wedge shape in axial view and have their inner ends connected to form a unitary resilient member, the blocks are pre-compressed in the cells under no-load condition, spaces are left in the cells under no-load condition for deformation of the blocks in the axial direction, the blocks are so compressed that when those blocks which are further compressed under load completely fill the cells the blocks in the other cells are still slightly compressed, and each block on its outer surface contacts the drum surface of the cell under pressure over at least 90% of its area, and the blades have a clearance not exceeding fifty thousandths of an inch at their outer ends from the inner surface of the drum.

By this combination of constructional features it is found that a device of comparatively simple construction and which will last for long periods under heavy load may be constructed and is especially suitable for small types of such devices.

Each of the blades preferably has its side surfaces flat and parallel to each other and the rubber member preferably has recesses around the inner ends of the blades.

The concentric members may be in the form of disc like flanges having bosses and formed with the blades which project axially therefrom and extend substantially radially so that their side surfaces can be machined by gang milling. The general construction of the concentric member blocks and drum may also be substantially as described in the specification of my said co-pending application.

The device including rubber blocks may be otherwise constructed generally in accordance with the description in the specification of my British Patent No. 641,425.

The invention will be further described by way of example with reference to the accompanying diagrammatic drawings wherein:

Figure 1 is a sectional view of a coupling made in accordance with the invention, the section being on the line 1—1 on Figure 3;

Figure 2 is a similar view but showing a modified construction; and

Figure 3:
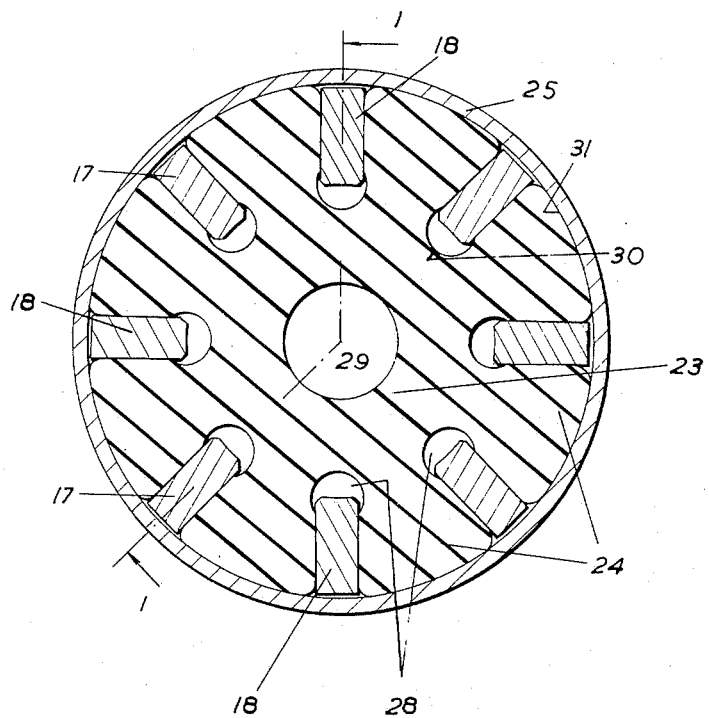
Figure 3 is a sectional view on the line 3—3 on Figures 1 and 2.

Two concentric members 10, 11 are made from identical castings and have bosses 12, 13, provided with tapped holes 14, 15 to receive screws for fixing to driving and driven shafts. The member 10 carries four radial blades 17 and the member 11 carries four radial blades 18. The blades 17, 18 alternate in the circumferential direction and have flat side surfaces 20, 21 which are parallel to each other. The inner ends of the blades are spaced from the axis of the device a distance greater than the radial dimension of the blade to leave ample space to accommodate the central part of a rubber member or spider 23 formed integrally with wedge shaped blocks 24 that are pre-compressed in the cells formed by adjacent blades and an outer drum 25 which surrounds the blades and blocks and is located axially (in the Figure 1 construction) by being shrunk on to the member 11.

The blocks 24 are of such size that spaces are left in the cells under no-load conditions for deformation of the blocks in the radial and/or axial direction and the blocks are so constructed that when the blocks which are further compressed under load completely fill the cells the blocks in the other cells are still slightly compressed.

The blocks are preferably deformed to not more than 20% linearly in any direction from their completely free condition when they completely fill the cells and the blocks may be of such size peripherally in relation to the spaces between the blades that they are compressed to five to ten per cent of their peripheral width on insertion into the cells. The blocks are preferably at all times in contact with the drum over substantially the whole area of the drum in the cells and in contact with the blades over substantially the whole area of the blades (e. g. at least 80 per cent of the area).

The blades have a clearance of about ten to fifty thousandths of an inch from the drum 25 at their outer ends.

In order that the blocks may at all times remain centrally disposed between the concentric members the rubber blocks and/or concentric members may have axially projecting rings bosses or the like which extend across the spaces between the blocks and said concentric members.

The member 23 has recesses 28 around the inner ends of the blades these recesses extending to a distance of about one to five sixteenths of an inch over the flat side surfaces of the blades from their inner ends outwards. These recesses seem to be particularly desirable in order to avoid undue strain at the roots of the rubber blocks where they join together to form a ringlike rubber member which may have a centre aperture engaged by a spigot carried by one of the concentric members.

The distance from the inner periphery 29 of the member 23 to the nearest parts 30 of the recesses is preferably more than half the distance from said parts of the recesses to the outer periphery 31 of the member 23.

The drum 25 is spaced from the member 10 by a gap 33 of between 30 and 125 thousandths of an inch.

In the modification shown in Figure 2, the blades 17 are carried by a separate ring 36 detachably secured to the member 10 by bolts 37 so that by removing the latter the member 10 can be removed by radial displacement. The drum 25 in this construction is located by means of an annular rib 38 thereon engaging in an annular recess 39 in the ring 36. The gap 33 is then between the drum and the member 11.

I claim:

A flexible device comprising two co-axial members, two sets of blades extending radially and longitudinally of the said members and which blades are connected alternately in the circumferential direction to one and the other of said concentric members, each blade having opposite surfaces which are flat and parallel to each other, an outer drum surrounding the blades so as to form cells, blocks of resilient material located in said cells said blocks being wedge shape in axial view and having their inner ends connected to form a unitary resilient member and being pre-compressed in the cells under no-load condition, spaces being left in the cells under no-load condition for deformation of the blocks in the axial direction, the blocks being so compressed that when those blocks which are further compressed under load completely fill the cells the blocks in the other cells are still slightly compressed, and each block on its outer surface contacts the drum surface of the cell under pressure over at least 90 per cent of its area, said blades having a clearance not exceeding fifty thousandths of an inch at their outer ends from the inner surface of the drum, and said resilient member having recesses around the edges of the inner ends of the blades; and one of said members comprising a ring which carries one of said sets of blades, a shaft engaging element located beyond the end of said outer drum, and bolts which secure said ring and element together.

References Cited in the file of this patent

UNITED STATES PATENTS

| Number | Name | Date |
|---|---|---|
| 565,935 | Sperry | Aug. 18, 1896 |
| 2,074,941 | Ricefield | Mar. 23, 1937 |
| 2,301,660 | Ricefield | Nov. 10, 1942 |
| 2,343,839 | Austin | Mar. 7, 1944 |